(12) United States Patent
Takeda

(10) Patent No.: US 7,591,571 B2
(45) Date of Patent: Sep. 22, 2009

(54) LIGHT SOURCE DEVICE AND PROJECTION DISPLAY APPARATUS

(75) Inventor: Mikiya Takeda, Tokyo (JP)

(73) Assignee: NEC Viewtechnology, Ltd., Minato-ku, Tokyo (JP)

( * ) Notice: Subject to any disclaimer, the term of this patent is extended or adjusted under 35 U.S.C. 154(b) by 74 days.

(21) Appl. No.: 11/281,625

(22) Filed: Nov. 18, 2005

(65) Prior Publication Data

US 2006/0109656 A1 May 25, 2006

(30) Foreign Application Priority Data

Nov. 19, 2004 (JP) .............................. 2004-336065

(51) Int. Cl.
F21V 29/00 (2006.01)
G03B 21/16 (2006.01)
G03B 21/20 (2006.01)

(52) U.S. Cl. ..................... 362/373; 353/57; 353/61; 353/119; 362/294

(58) Field of Classification Search ............... 362/294, 362/263, 264, 373, 345, 276, 21, 22, 96, 362/218; 353/119, 57–61, 122; 313/552
See application file for complete search history.

(56) References Cited

U.S. PATENT DOCUMENTS

| 4,910,873 A * | 3/1990 | Nelson, Jr. .................... 353/61 |
| 6,227,686 B1 * | 5/2001 | Takahashi et al. ........... 362/345 |
| 6,398,366 B1 * | 6/2002 | Hara et al. ..................... 353/57 |
| 6,494,581 B2 * | 12/2002 | Shimizu ........................ 353/61 |
| 6,698,899 B2 * | 3/2004 | Yamada et al. ................ 353/61 |
| 6,709,112 B2 * | 3/2004 | Miyamoto et al. ............ 353/57 |
| 6,902,275 B2 * | 6/2005 | Yamada et al. ................ 353/61 |
| 2004/0169825 A1 * | 9/2004 | Ozawa et al. .................. 353/61 |
| 2004/0228130 A1 * | 11/2004 | Kato et al. ................... 362/294 |

FOREIGN PATENT DOCUMENTS

| JP | 2003-29337 | 1/2003 |
| JP | 2003-202630 | 7/2003 |
| JP | 2003-215706 | 7/2003 |
| JP | 2003-344949 | 12/2003 |
| JP | 2004-294749 | 10/2004 |

* cited by examiner

Primary Examiner—Ismael Negron
Assistant Examiner—David Crowe
(74) Attorney, Agent, or Firm—McGinn IP Law Group, PLLC

(57) ABSTRACT

A projection display apparatus generates image light by modulating, with an image signal, light emitted from a light source disposed in a lamp house, and projects the generated image light onto a screen. The projection display apparatus has an air inlet duct for introducing air, to cool the light source, into the lamp house and an air outlet duct for expelling the air discharged from the lamp house out of the projection display apparatus. The air outlet duct has an opening defined in a side wall thereof, and a lid pivotally mounted thereon for selectively opening and closing the opening. The lid is not opened under normal pressure in the air outlet duct when the light source operates normally, and is opened when an abnormal pressure buildup higher than the normal pressure is applied to the lid, thereby releasing the pressure buildup.

13 Claims, 7 Drawing Sheets

LIGHT SOURCE DEVICE AND PROJECTION DISPLAY APPARATUS

BACKGROUND OF THE INVENTION

1. Field of the Invention

The present invention relates to a light source device and a projection display apparatus, and more particularly to a technology for minimizing damage caused when a high-pressure discharge lamp as a light source is burst.

2. Description of the Related Art

Projection display apparatus such as liquid crystal projectors and DLP (Digital Light Processing) projectors have recently been in widespread use. Generally, a projection display apparatus has a lamp as a light source, an image forming device for modulating light emitted from the lamp with an image signal, and an image optics for projecting image light that is generated by the image forming device onto a screen at an enlarged scale.

One conventional DLP projector having three digital micromirror devices (DMDS) is shown in FIG. 1 of the accompanying drawings. As shown in FIG. 1, the DLP projector has a light source comprising high-pressure discharge lamp 50 placed in metal lamp house 51 that is disposed in a main housing. Light emitted from high-pressure discharge lamp 50 is collected and guided by a reflector to travel through a predetermined light path to prism unit 52. The light applied to prism unit 52 is separated thereby into color lights in three primaries, i.e., red (R), green (G), and blue (B). Each of the separated color lights are then applied to the DMDs (not shown). The DMDs modulate the respective color lights and output the modulated color lights again to prism unit 52, which combines the color lights into image light. The image light is then projected by projection lens 53 onto a screen (not shown) at an enlarged scale.

The DLP projector also has a cooling fan 55 disposed in the main housing to cool high-pressure discharge lamp 50. Cooling fan 55 delivers cooling air (ambient air) through inlet duct 56 into lamp house 51. After having cooled high-pressure discharge lamp 50, the cooling air is discharged through outlet duct 57 out of the main housing. High-pressure discharge lamp 50 is burst on rare occasions due to shocks, abnormal temperature rises, or individual lamp defects inherent in high-pressure discharge lamp 50. When high-pressure discharge lamp 50 is ruptured, the bulb thereof and the nearby reflector are broken up into pieces under the shock of the rupture, and the broken pieces tend to flow through outlet duct 57 and be ejected from the main housing. To avoid damage due to the ejected pieces, outlet duct 57 is designed to have a snake like shape with increased length and which incorporates therein three metal mesh filters 58 through 60 to prevent the broken pieces from being scattered out of the main housing. Details of the structure for preventing the broken pieces from being scattered out of the main housing are disclosed in Japanese laid-open patent publication No. 2003-202630 and Japanese laid-open patent publication No. 2004-294749.

Xenon lamps have a high internal bulb pressure of about 20 atmospheric pressures and a large volume. When they are burst, they are liable to release energy large enough to deform the metal lamp house which houses the xenon lamp therein. If the light source of a projection display apparatus comprises a xenon lamp, therefore, it is necessary to combine the xenon lamp with a more reliable and stronger structure for preventing broken pieces of the lamp from being ejected rather than instead of using other lamps as the light source.

The conventional proposal to use a longer outlet duct with metal mesh filters disposed therein is disadvantageous in that the cooling air cannot be discharged efficiently and has a reduced cooling effect, and the projector itself tends to become unduly large in size. In Particular, the longer outlet duct directly results in an increase in the size of the projector.

SUMMARY OF THE INVENTION

It is an object of the present invention to provide a light source device and a projection display apparatus which have a structure for reliably preventing broken pieces of a lamp from being scattered out when the lamp is ruptured, without causing an increase in the size of the light source device and the projection display apparatus and without causing a reduction in the cooling effect.

According to an aspect of the present invention, there is provided a projection display apparatus comprising a lamp house, a high-pressure discharge lamp disposed in the lamp house, an image forming device for modulating light emitted from the high-pressure discharge lamp with an image signal, and an image optics for projecting image light generated by the image forming device, the lamp house having an air inlet port for introducing cooling air therethrough, an air outlet port for discharging the cooling air that is introduced through the air inlet port, at least one opening other than the air inlet port and the air outlet port, and a lid for opening the opening only when a pressure higher than the pressure of the cooling air that is introduced through the air inlet port and discharged through the air outlet port is applied to the lid.

According to another aspect of the present invention, there is provided a projection display apparatus comprising an air outlet duct that is connected to the air outlet port of the lamp house and has at least one opening and a lid for opening the opening only when a pressure higher than the pressure of the cooling air introduced that is through the air inlet port and discharged through the air outlet port is applied to the lid.

According to still another aspect of the present invention, there is provided a light source device comprising a lamp house and a high-pressure discharge lamp disposed in the lamp house, the lamp house having an air inlet port for introducing cooling air therethrough, an air outlet port for discharging the cooling air that is introduced through the air inlet port, at least one opening other than the air inlet port and the air outlet port, and a lid for opening the opening only when a pressure higher than the pressure of the cooling air introduced through the air inlet port and discharged through the air outlet port is applied to the lid.

According to yet another aspect of the present invention, there is provided a light source device comprising an air outlet duct that is connected to the air outlet port of the lamp house and has at least one opening and a lid for opening the opening only when a pressure higher than the pressure of the cooling air introduced through the air inlet port and discharged through the air outlet port is applied to the lid.

The lid is not opened under a pressure lower than the pressure of the cooling air that is introduced through the air inlet port and discharged through the air outlet port, and is opened only when a pressure higher than the pressure of the cooling air that is introduced through the air inlet port and discharged through the air outlet port is applied to the lid.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
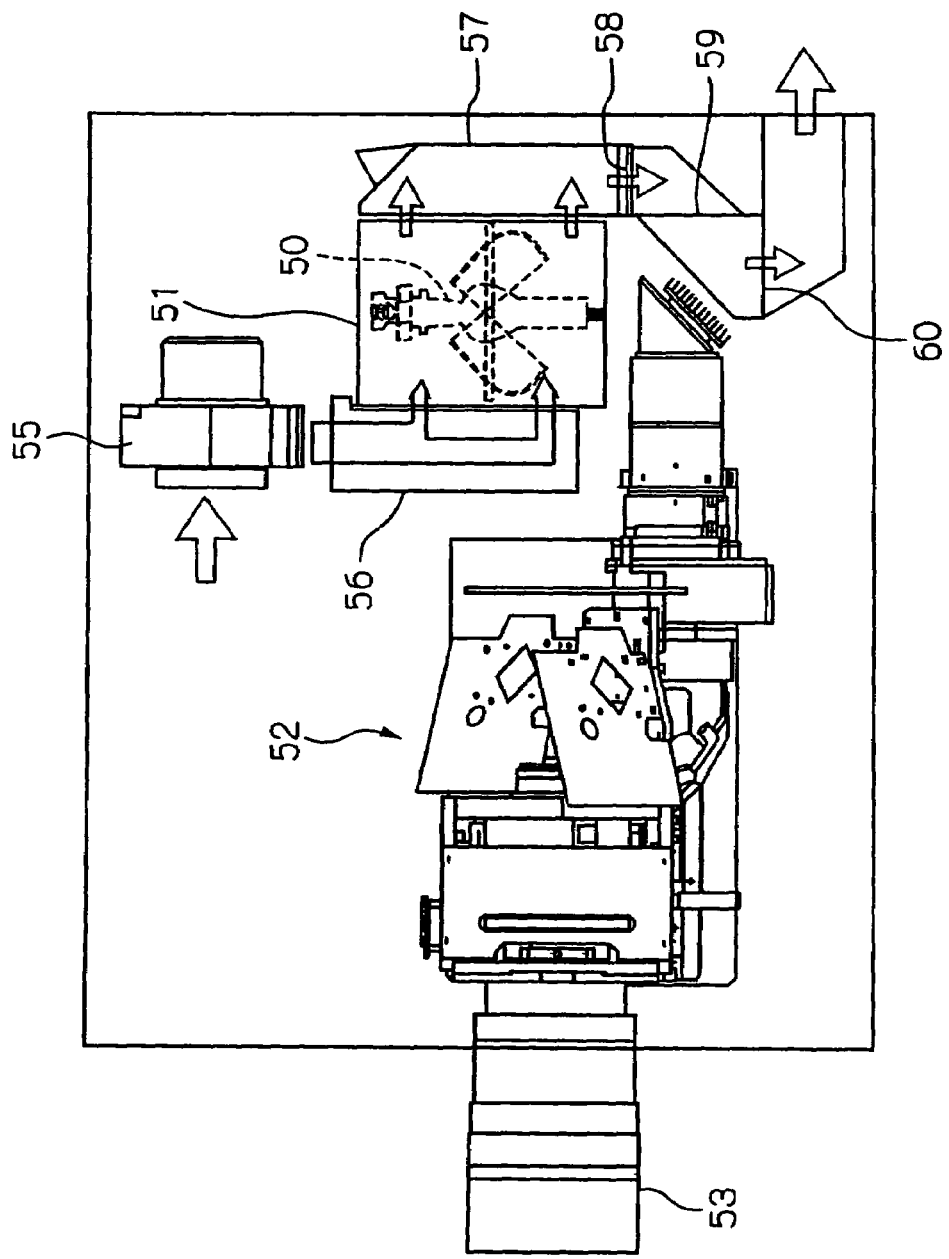
FIG. 1 is a schematic plan view of a conventional projection display apparatus.

Like or corresponding parts are denoted by like or corresponding reference characters throughout views.

1st Embodiment

Figure 2:
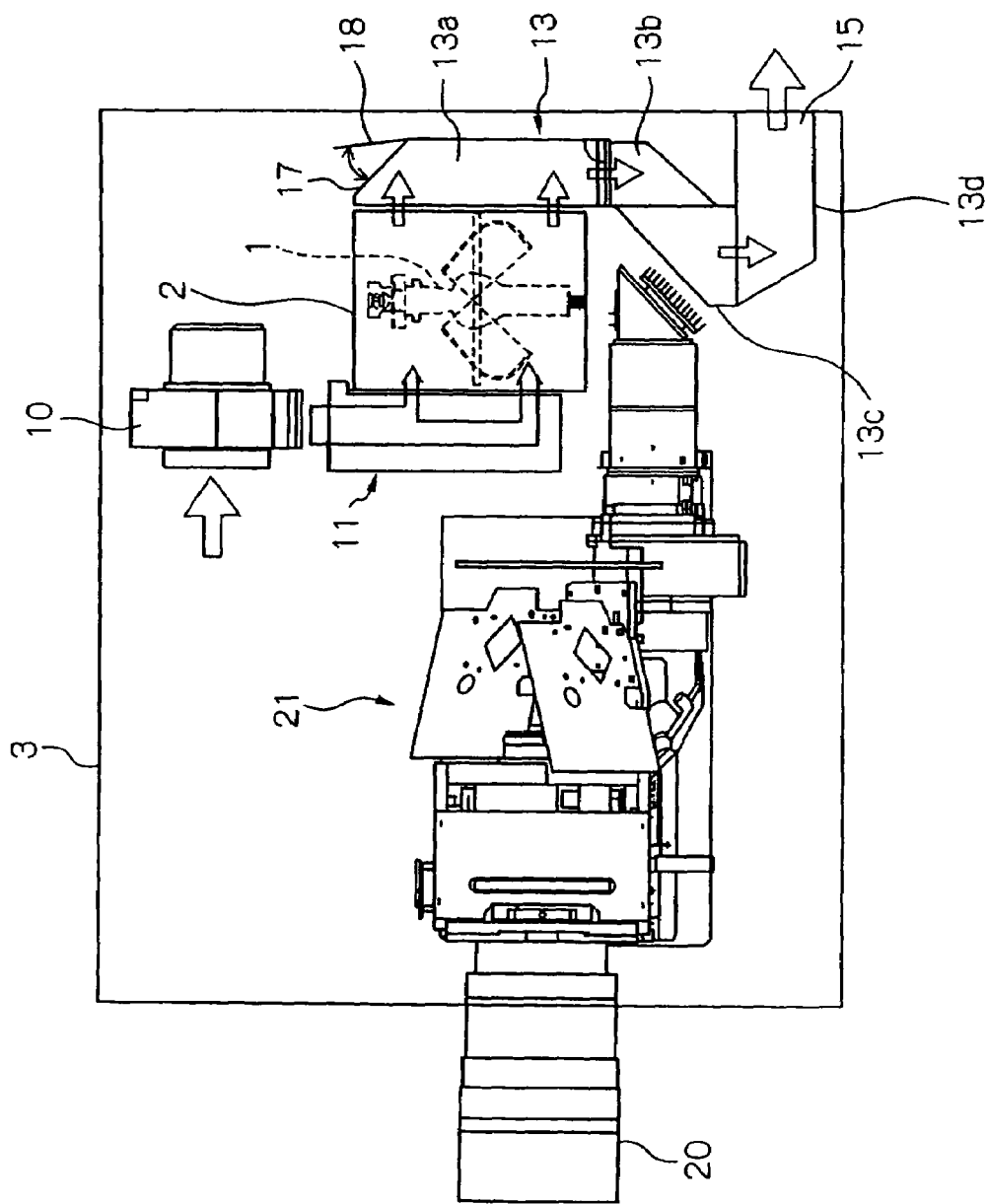
FIG. 2 is a schematic plan view of a projection display apparatus according to a first embodiment of the present invention.
Figure 3:
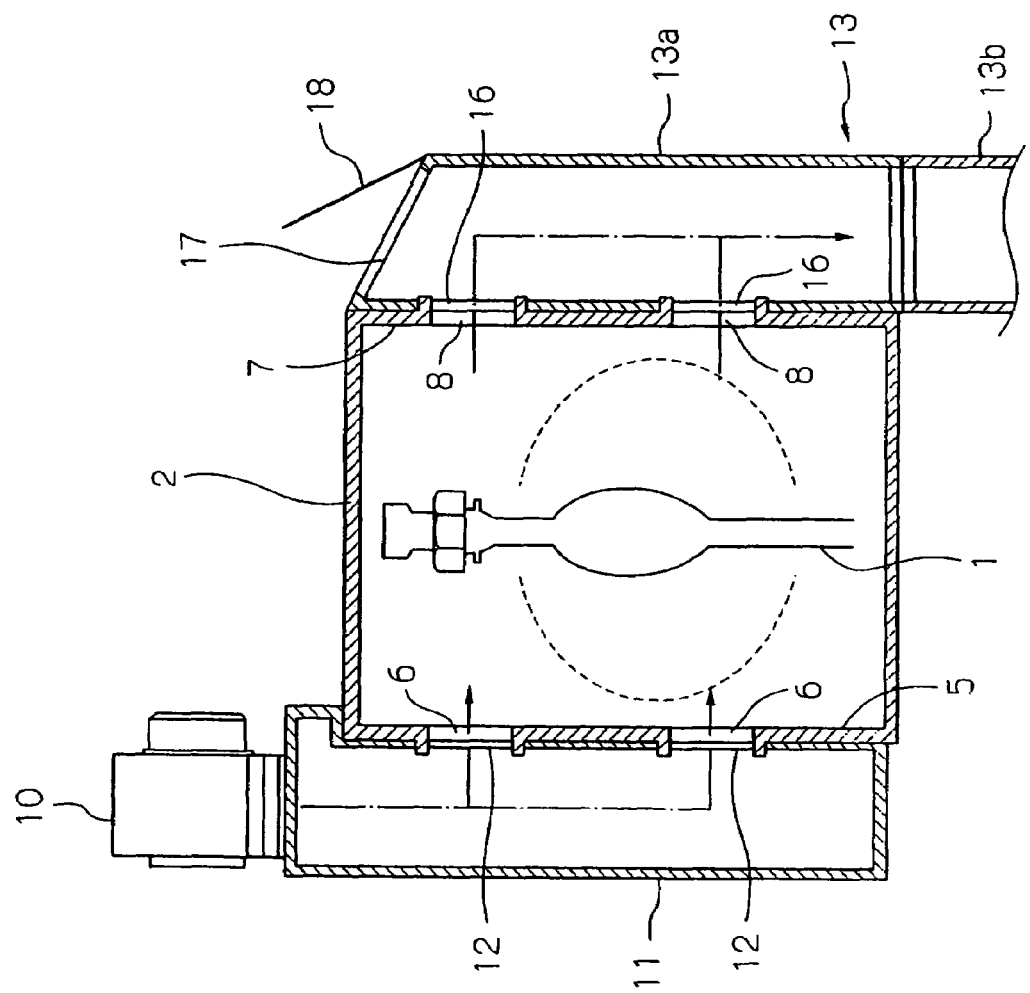
FIG. 3 is an enlarged cross-sectional view of a lamp house and nearby components of the projection display apparatus shown in FIG. 2.
Figure 4:
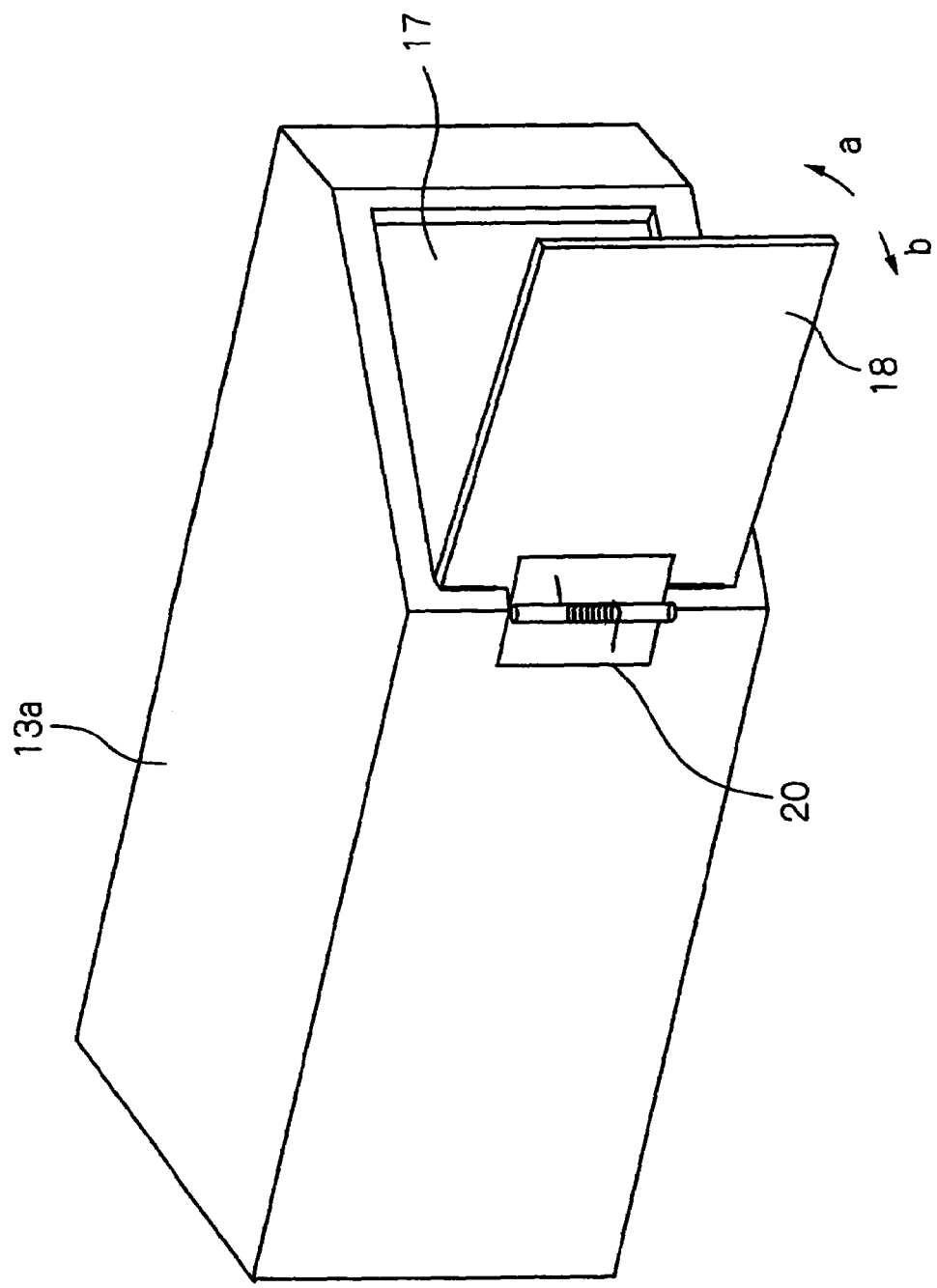
FIG. 4 is an enlarged perspective view of a first duct member of the projection display apparatus shown in FIG. 2.

A projection display apparatus according to a first embodiment of the present invention is a DLP projector having DMDs (Digital Micromirror Devices) as image forming devices (light valves). FIG. 2 shows in schematic plan the projection display apparatus according to the first embodiment of the present invention. FIG. 3 shows in enlarged cross section a lamp house and nearby components of the projection display apparatus shown in FIG. 2. FIG. 4 shows in enlarged perspective a part of first duct member of the projection display apparatus shown in FIG. 2.

As shown in FIG. 2, lamp house 2 is disposed in a main housing 3 of the DLP projector, and accommodates therein xenon lamp 1 as a light source. Lamp house 2 is in the form of a metal box. Lamp house 2 houses therein a reflector for collecting and guiding light emitted from xenon lamp 1. Lamp house 2 has a window (not shown) though which the light that is guided by the reflector is projected from the lamp house 2.

As shown in FIG. 3, lamp house 2 has two air inlet ports 6 defined in side wall 5 thereof and two air outlet ports 8 defined in side wall 7 that is located opposite to side wall 5. The main housing 3 accommodates therein cooling fan 10 in the form of a sirocco fan. Lamp house 2 communicates with cooling fan 10 through air inlet ports 6 and communicates with the exterior of the main housing 3 through air outlet ports 8. Specifically, air inlet duct 11 has an end opening that is connected to an air delivery port (not shown) of cooling fan 10 and also has two air discharge ports 12 defined in a side wall thereof. Air discharge ports 12 are connected each of air inlet ports 6 of lamp house 2. Air outlet duct 13 has an end opening that is connected to air exhaust port 15 (see FIG. 2) defined in the main housing 3 and hence communicates with the exterior of the main housing 3. Air outlet duct 13 has two air intake ports 16 defined in a side wall thereof and connected to each of air outlet ports 8 of lamp house 2. Each of air inlet ports 6 of lamp house 2 have protruding flanges fitted in each of air discharge ports 12 of air inlet duct 11. Similarly, each of air outlet ports 8 have protruding flanges fitted in each of air intake ports 16 of air outlet duct 13. Air inlet duct 11 and air outlet duct 13 may have flanges held in close contact with side walls 5, 7, respectively. Alternatively, lamp house 2, air inlet duct 11, and air outlet duct 13 may have no flanges at all.

As shown in FIG. 2, air outlet duct 13 comprises first duct member 13a, second duct member 13b, third duct member 13c, and fourth duct member 13d. These duct members 13a through 13d are in the form of prismatic tubes made of synthetic resin or metal. As shown in FIG. 3, air intake ports 16 that are connected to each of air outlet ports 8 of lamp house 2 are defined in a side wall of first duct member 13a. As shown in FIG. 2, fourth duct member 13d has an end that is connected to air exhaust port 15 defined in the main housing 3. Second duct member 13b and third duct member 13c are positioned between and interconnect first duct member 13a and fourth duct member 13d.

First duct member 13a has opening 17 defined in an end wall thereof that is opposite the end wall thereof that is joined to second duct member 13b. Plate-like lid 18 is swingably mounted on first duct member 13a for selectively opening and closing opening 17. As shown in FIG. 4, lid 18 has a side edge pivotally mounted on a side edge of opening 17 by spring-biased hinge 20. Lid 18 is normally urged by spring-biased hinge 20 to close opening 17 as indicated by the arrow "a". Lid 18 can be opened as indicated by the arrow "b" only when xenon lamp 1 (see FIG. 2) is burst. Specifically, when xenon lamp 1 is burst, the internal pressure in lamp house 2 increases, and hence the internal pressure in first duct member 13a that is connected to lamp house 2 also increases. The pressure buildup in first duct member 13a pushes lid 18 open against the bias of spring-biased hinge 20, as indicated by the arrow "b". Now, the pressure in first duct member 13a is released through opening 17. Cooling fan 10 forcibly delivers ambient air as cooling air into lamp house 2. After having cooled xenon lamp 1 in lamp house 2, the cooling air is discharged to the exterior through air outlet duct 13. The spring force of spring-biased hinge 20 is set to such a value that lid 18 is not opened under normal pressure (air pressure) P in air outlet duct 13, and lid 18 is opened under a pressure buildup in lamp house 2 that is higher than the pressure P.

When the pressure in lamp house 2 rises to an abnormally high level due to the rupture of xenon lamp 1, lid 18 is automatically opened under the pressure buildup to release the excessive pressure through opening 17. Therefore, broken pieces of xenon lamp 1 are prevented from being ejected from the main housing 3 through air outlet duct 13 even if the number of mesh filters that are disposed in air outlet duct 13 is smaller than in the conventional projection display apparatus. Consequently, the projection display apparatus according to the first-embodiment provides the same safety as or higher safety than the conventional projection display apparatus with a smaller number of mesh filters disposed in air outlet duct 13.

According to the first embodiment, mesh filters are interposed between first duct member 13a and second duct member 13b and between third duct member 13c and fourth duct member 13d. Stated otherwise, no mesh filter is interposed between second duct member 13b and third duct member 13c.

When the pressure in lamp house 2 drops back to a normal level, opening 17 is automatically closed by lid 18 under the bias of spring-biased hinge 20. When broken xenon lamp 1 is replaced with new xenon lamp 1, the light source device can be used again. Lamp house 2 and air outlet duct 13 do not need to be replaced.

The number of mesh filters used and the locations of those mesh filters are determined taking into consideration the length and volume of air outlet duct 13. Therefore, the number of the mesh filters and the locations thereof are not limited to those described above. According to the present invention, however, the projection display apparatus provides the same safety as or higher safety than the conventional projection display apparatus with a smaller number of mesh filters disposed in air outlet duct 13 insofar as those projection display apparatus are used under the same conditions.

Figure 5:
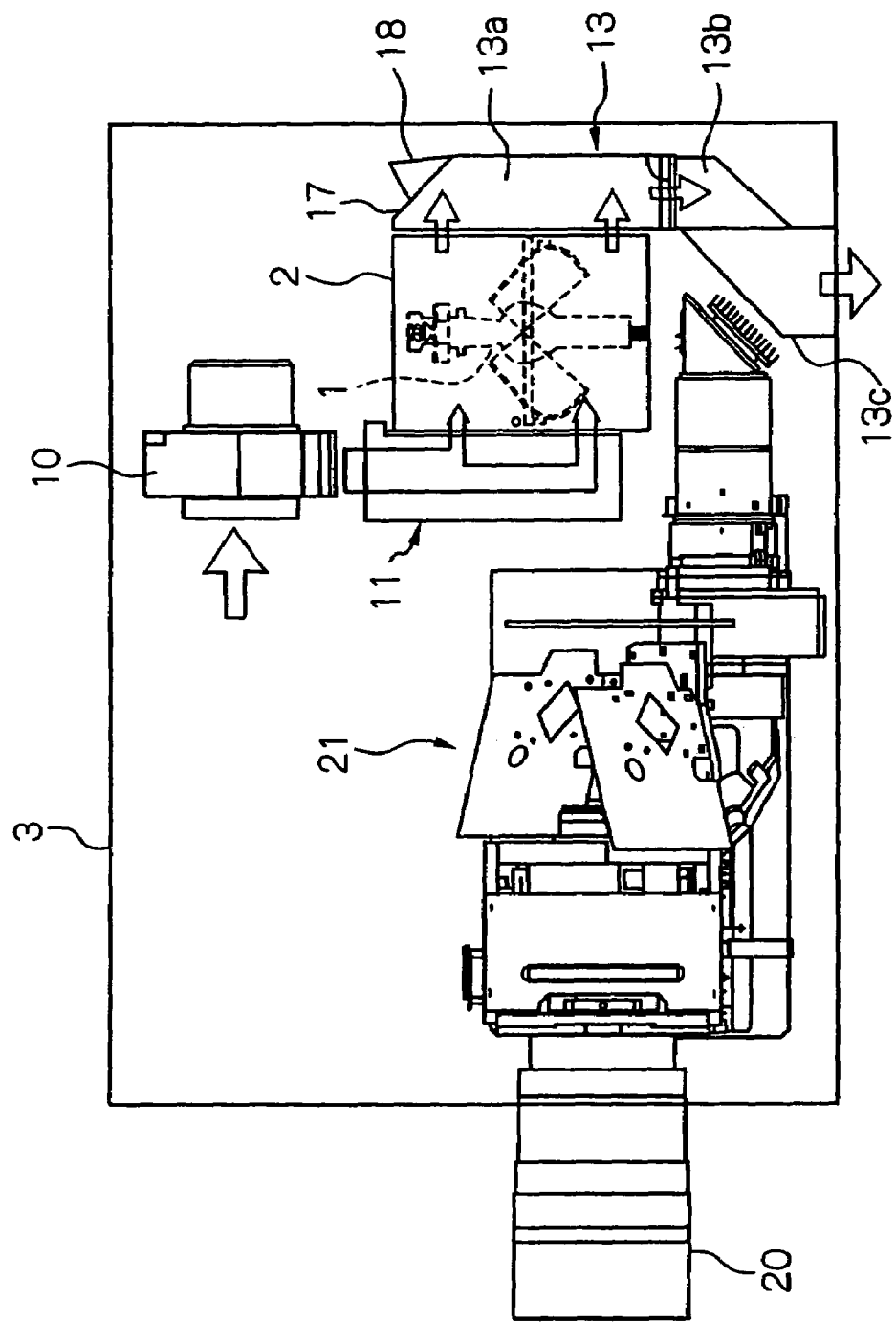
FIG. 5 is a schematic plan view of a projection display apparatus according to second embodiment of the present invention.

According to the present invention, furthermore, the projection display apparatus provides the same safety as or higher safety than the conventional projection display apparatus even if air outlet duct 13 shown in FIG. 2 is shorter. FIG. 5 shows in schematic plan a projection display apparatus with a shorter air outlet duct according to a modification of the first embodiment. The projection display apparatus shown in FIG. 5 is also a DLP projector. The DLP projector shown in FIG. 5 has air outlet duct 13 comprising first duct member 13a, second duct member 13b, and third duct member 13c, with fourth duct member 13d being dispensed with. Third duct member 13c communicates with the exterior of the main housing 3. Air outlet duct 13 shown in FIG. 5 allows housing 3 and hence the DLP projector to be reduced in size. Those parts shown in FIG. 5 which are identical to those shown in FIG. 2 are denoted by identical reference characters.

Other details of the DLP projectors shown in FIGS. 2 and 5 which have not been described above are identical to those of the conventional DLP projector. Specifically, light emitted from xenon lamp 1 is collected and guided by a reflector to travel through a predetermined light path to prism unit 21. The light applied to prism unit 21 is separated thereby into color lights in three primaries, i.e., red (R), green (G), and blue (B). Each of the separated color lights are then applied respectively to the DMDs (not shown). The DMDs modulate the respective color lights and output the modulated color lights again to prism unit 21, which combines the color lights into image light. The image light is then projected by projection lens 22 onto a screen (not shown) at an enlarged scale.

The projection display apparatus according to the present invention is not limited to a 3-chip DLP projector. The present invention is applicable to all projection display apparatus which employ a high-pressure discharge lamp as a light source, including 1-chip DLP projectors and liquid crystal projectors.

2nd Embodiment

Figure 6:
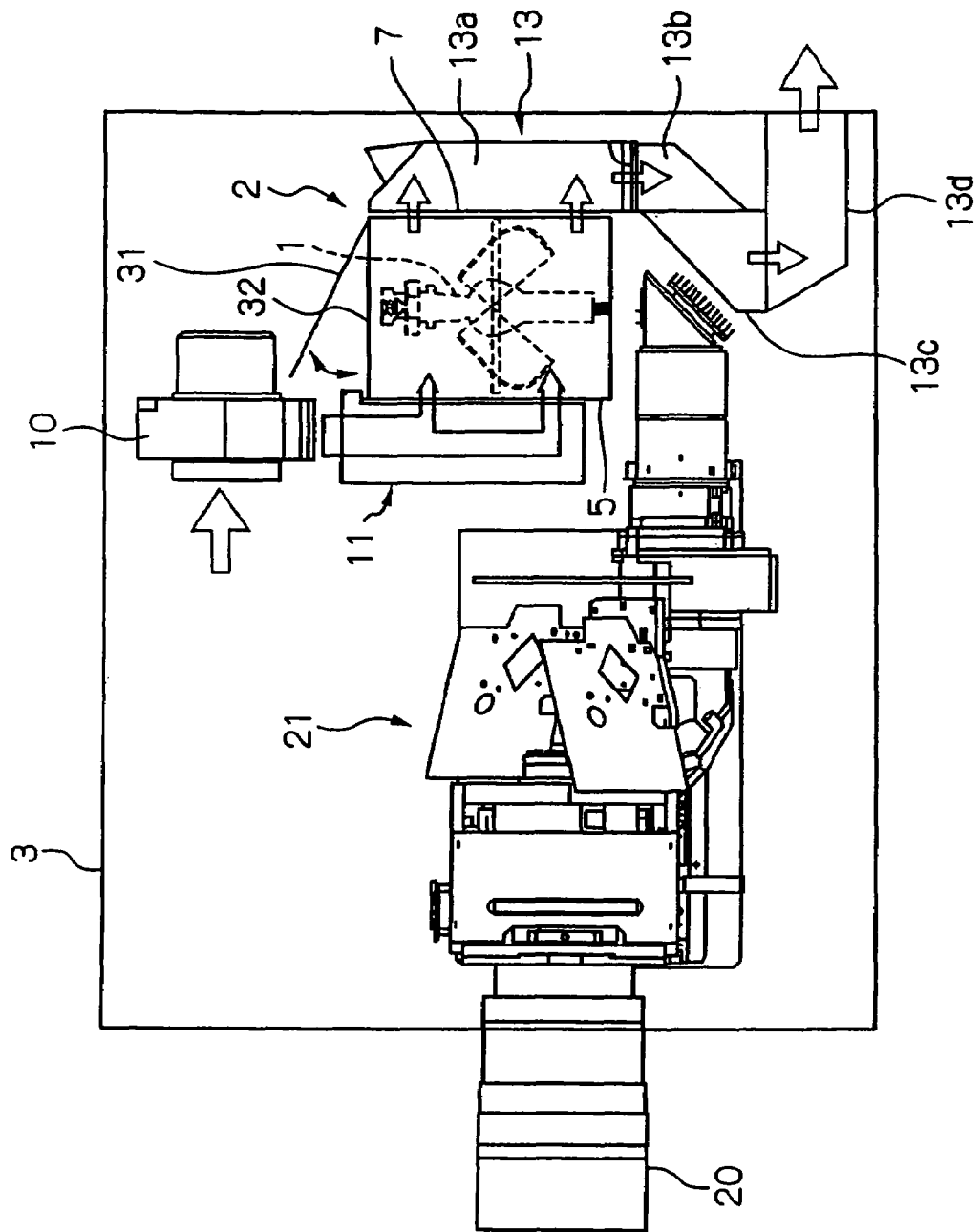
FIG. 6 is a schematic plan view of a projection display apparatus according to a third embodiment of the present invention.
Figure 7:
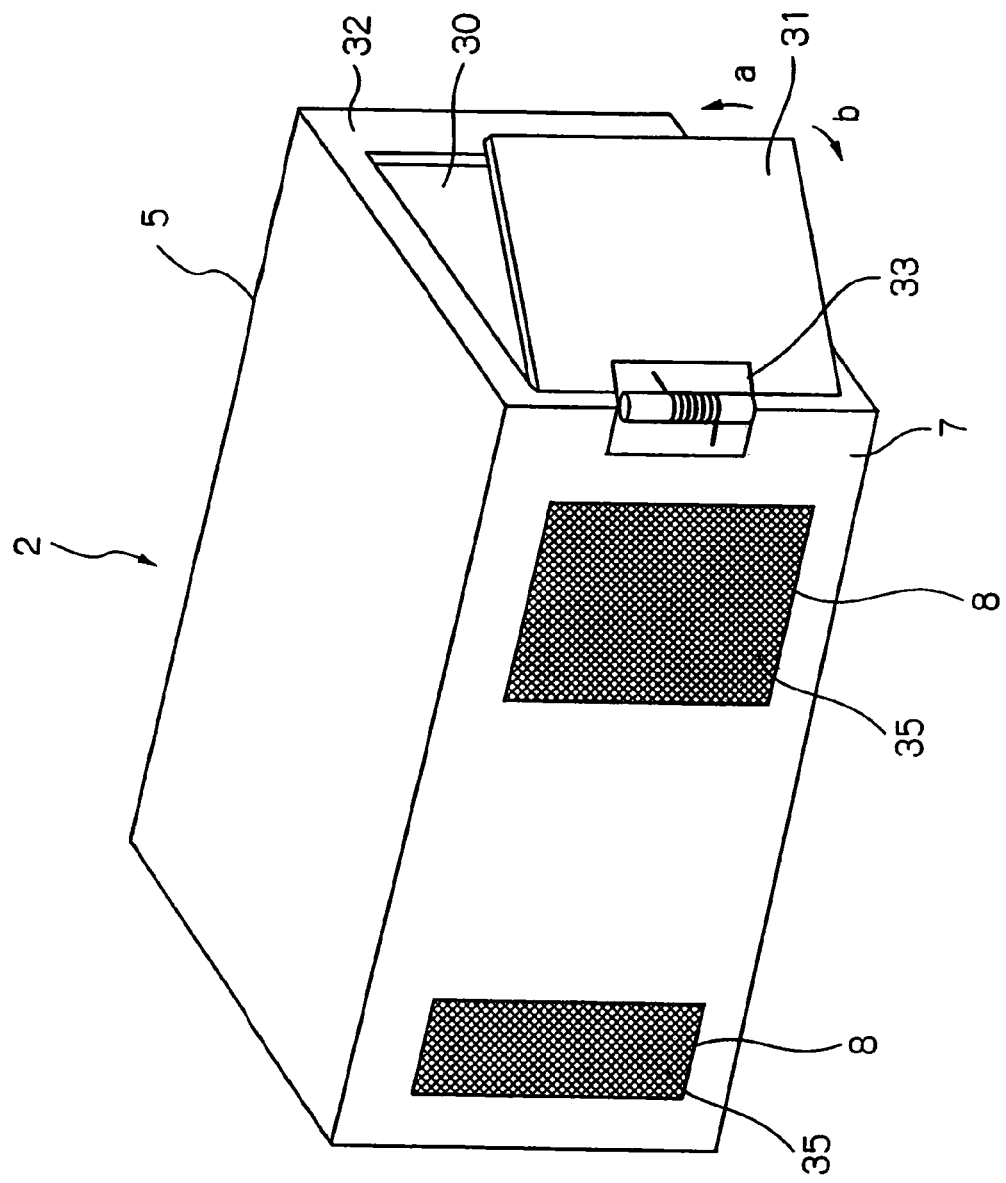
FIG. 7 is an enlarged perspective view of a lamp house of the projection display apparatus shown in FIG. 5.

A projection display apparatus according to a second embodiment of the present invention is shown in FIGS. 6 and 7. The projection display apparatus according to the second embodiment is a DLP projector having basic structural details identical to those of the DLP projectors shown in FIGS. 2 and 5. Those parts shown in FIG. 6 and 7 which are identical to those shown in FIGS. 2 and 5 are denoted by identical reference characters, and will not be described in detail below.

The DLP projector according to the second embodiment differs from the DLP projector according to the first embodiment in that lamp house 2 has opening 30 and lid 31. Specifically, as shown in FIGS. 6 and 7, opening 30 is defined in side wall 32 of lamp house 2 which lies perpendicularly to side wall 5 connected to air inlet duct 11 and side wall 7 connected to air outlet duct 13. Opening 30 is omitted from illustration in FIG. 6 for the sake of brevity. Plate-like lid 31 is swingably mounted on lamp house 2 for selectively opening and closing opening 30. As shown in FIG. 7, lid 31 has a side edge pivotally mounted on a side edge of opening 30 by spring-biased hinge 33. Lid 31 is normally urged by spring-biased hinge 33 to close opening 30 as indicated by the arrow "a". Lid 31 can be opened as indicated by the arrow "b" only when xenon lamp 1 (see FIG. 6) is burst. Specifically, when xenon lamp 1 is burst, the internal pressure in lamp house 2 increases. The pressure buildup in lamp house 2 pushes lid 31 open against the bias of spring-biased hinge 33, as indicated by the arrow "b". At this stage, the pressure in lamp house 2 is released through opening 30. Cooling fan 10 forcibly delivers ambient air as cooling air into lamp house 2. After having cooled xenon lamp 1 in lamp house 2, the cooling air is discharged to the exterior though air outlet duct 13. The spring force of spring-biased hinge 33 is set to such a value that lid 33 is not opened under normal pressure (air pressure) P in lamp house 2 and lid 33 is opened under pressure buildup in lamp house 2 that is higher than the pressure P.

As shown in FIG. 7, mesh filters 35 are fitted in each of air outlet ports 8 that are defined in side wall 7 of lamp house 2. Air outlet ports 8 have different sizes.

When xenon lamp 1 is ruptured, lid 31 is automatically opened under the pressure buildup to release the excessive pressure through opening 30. Therefore, as with the DLP projector according to the first embodiment, the projection display apparatus according to the second embodiment provides the same safety as or higher safety than the conventional projection display apparatus with a smaller number of mesh filters being used. The projection display apparatus according to the second embodiment provides the same safety as or higher safety than the conventional projection display apparatus even if air outlet duct 13 is shorter.

The projection display apparatus according to the present invention include projection display apparatus having all the features described above. For example, the projection display apparatus may have openings which are defined in both the lamp house and the air outlet duct and which can be automatically opened under a pressure buildup developed when the light source is ruptured.

According to the first embodiment, of the duct members of the air outlet duct, the duct member that is positioned most closely to the lamp house has an opening that can automatically be opened by a lid. However, another duct member may have such an opening. From the standpoint of quickly releasing the pressure buildup from the lamp house, it is preferable that an opening that can be automatically opened by a lid be positioned on the lamp house or as close as possible to the lamp house. Though the air outlet duct is constructed of a plurality of duct members according to the first and second embodiments, the air outlet duct may comprise a single duct member.

While preferred embodiments of the present invention have been described using specific terms, such description is for illustrative purposes only, and it is to be understood that changes and variations may be made without departing from the spirit or scope of the following claims.

What is claimed is:

1. A light source device comprising:
    a lamp house comprising an air inlet port for introducing cooling air into said lamp house and an air outlet port for discharging the cooling air introduced through said air inlet port;
    a high-pressure discharge lamp disposed in said lamp house; and
    an air outlet duct comprising:
        a first duct member comprising:
            a first wall having an air intake port which is connected to said air outlet port for expelling the cooling air discharged through said air outlet port out of the light source device;
            a second wall having an opening; and
            a lid which covers said opening in a closed position, and swings on a hinge in a direction away from said air outlet port to uncover said opening; and a second duct member which is connected to an end of said first duct member, said second wall having said opening being formed on another end of said first duct member, wherein said lid is urged by a resilient member to move in a direction to close said opening.

2. A light source device comprising:
a main housing comprising an air exhaust port;
a lamp house formed in said main housing;
an air outlet duct formed on said lamp house; and
a high-pressure discharge lamp disposed in said lamp house;
wherein said lamp house comprises:
an air inlet port for introducing cooling air therethrough, and an air outlet port for discharging the cooling air introduced through said air inlet port, and
wherein said air outlet duct is connected to said air exhaust port and comprises:
a first duct member comprising:
a first wall having an air intake port which is connected to said air outlet port;
a second wall having an opening; and
a lid which covers said opening in a closed position, and swings on a hinge in a direction away from said air outlet port to uncover said opening, said lid being urged in said closed position by an urging member; and
a second duct member which is connected to an end of said first duct member, said second wall having said opening being formed on another end of said first duct member.

3. A light source device comprising:
a main housing comprising an air exhaust port
a lamp house formed in said main housing and comprising an air inlet port for introducing cooling air into said lamp house and an air outlet port for discharging the cooling air introduced through said air inlet port;
a high-pressure discharge lamp disposed in said lamp house; and
an air outlet duct which is connected to said air exhaust pod, said air outlet duct comprising:
a first duct member comprising:
a first wall having an air intake port which is connected to said air outlet port for expelling the cooling air discharged through said air outlet port out of the light source device;
a second wall having an opening; and
a lid which covers said opening in a closed position, and swings on a binge in a direction away from said air outlet port to uncover said opening, said lid being urged in said closed position by an urging member; and
a second duct member which is connected to an end of said first duct member, said second wall having said opening being formed on another end of said first duct member.

4. The light source device according to claim 3, farther comprising:
an air inlet duct connected to said air inlet port for directing the cooling air into the air inlet port.

5. The light source device according to claim 4, wherein said air inlet duct and said air outlet duct are formed on opposing sidewalk of said lamp house.

6. A projection display apparatus comprising:
a main housing comprising an air exhaust port;
a lamp house formed in said main housing;
an air outlet duct formed on said lamp house;

a high-pressure discharge lamp disposed in said lamp house;
an image forming device for modulating light emitted from said high-pressure discharge lamp with an image signal; and
an image optics for projecting image light generated by said image forming device,
wherein said lamp house comprises:
an air inlet port for introducing cooling air therethrough, and an air outlet port for discharging the cooling air introduced through said air inlet port, and
wherein said air outlet duct is connected to said air exhaust port and comprises:
a first duct member comprising:
a first wall having an air intake port which is connected to said air outlet port;
a second wall having an opening; and
a lid which covers said opening in a closed position, and swings on a hinge in a direction away from said air outlet port to uncover said opening, said lid being urged in said closed position by an urging member; and
a second duct member which is connected to an end of said first duct member, said second wall having said opening being formed on another end of said first duct member.

7. The light source device according to claim 1, wherein said urging member comprises a spring which biases said hinge.

8. The light source device according to claim 1, further comprising:
a cooling fan for moving the cooling air through said lamp house and out of said air exhaust port via said air outlet duel;
wherein said urging member applies a biasing force to said lid which is greater than a pressure of the cooling air being moved by the cooling fan and introduced through said air inlet port and discharged through said air outlet port.

9. The light source device according to claim 8, wherein said biasing force is less than a pressure applied to said lid by a bursting of said high-pressure discharge lamp.

10. The light source device according to claim 1, further comprising:
a mesh filter formed in said air outlet duct.

11. The projection display apparatus according to claim 1, further comprising:
a cooling fan for moving air through said lamp house and out of said air exhaust port via said air outlet duct.

12. The projection display apparatus according to claim 1, wherein said first duct member comprises a third wall which is formed opposite said first wall, said hinge being formed at a joint between said second and third walls.

13. A projection display apparatus comprising:
a main housing comprising an air exhaust port;
a lamp house formed in said main housing and comprising an air inlet port for introducing cooling air into said lamp house and an air outlet port for discharging the cooling air introduced through said air inlet port;
a high-pressure discharge lamp disposed in said lamp house;
an image forming device for modulating light emitted from said high-pressure discharge lamp with an image signal;
an image optics for projecting image light generated by said image forming device; and
an air outlet duct which is connected to said air exhaust port, said air outlet duct comprising:

a first duct member comprising:
- a first wall having an air intake port which is connected to said air outlet port for expelling the cooling air discharged through said air outlet port out of the projection display apparatus;
- a second wall having an opening; and
- a lid which covers said opening in a closed position, and swings on a hinge in a direction away from said air outlet port to uncover said opening, said lid being urged in said closed position by an urging member; and a second duct member which is connected to an end of said first duct member, said second wall having said opening being formed on another end of said first duct member.

* * * * *